US009143412B1

(12) United States Patent
Nay et al.

(10) Patent No.: US 9,143,412 B1
(45) Date of Patent: Sep. 22, 2015

(54) PROXY REPORTING FOR CENTRAL MANAGEMENT SYSTEMS (71) Applicant: Google Inc., Mountain View, CA (US)

(72) Inventors: Shane R. Nay, San Jose, CA (US); Alan Howard Davis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 260 days.

(21) Appl. No.: 13/796,300

(22) Filed: Mar. 12, 2013

Related U.S. Application Data (60) Provisional application No. 61/714,341, filed on Oct. 16, 2012.

(51) Int. Cl.
G06F 15/16 (2006.01)
H04L 12/26 (2006.01)

(52) U.S. Cl.
CPC ........................................ *H04L 43/04* (2013.01)

(58) Field of Classification Search
CPC .............. H04L 29/12264; H04L 41/12; H04L 61/2015; H04L 61/2046; H04L 67/1002
USPC .................. 709/224, 220, 223, 203, 218, 219
See application file for complete search history.

(56) References Cited

U.S. PATENT DOCUMENTS

| 7,437,505 | B2 * | 10/2008 | Chew | 711/112 |
| 2002/0026506 | A1 * | 2/2002 | Herrmann et al. | 709/223 |
| 2005/0114507 | A1 * | 5/2005 | Tarui et al. | 709/224 |
| 2008/0086731 | A1 * | 4/2008 | Trossman et al. | 718/100 |
| 2010/0085971 | A1 * | 4/2010 | Schunemann | 370/392 |
| 2010/0293270 | A1 * | 11/2010 | Augenstein et al. | 709/224 |
| 2012/0053871 | A1 * | 3/2012 | Sirard | 702/63 |

OTHER PUBLICATIONS

Universal Serial Bus Specification, by Compaq et al., Revision 2.0, Apr. 27, 2000 [650 pages].

* cited by examiner

Primary Examiner — Ruolei Zong
(74) Attorney, Agent, or Firm — Lerner, David, Littenberg, Krumholz & Mentlik, LLP (57) ABSTRACT An apparatus for providing telemetry information of monitored equipment is disclosed. The apparatus may store a first set of application mappings and a second set of application mappings. The first set of application mappings may be established when equipment to be monitored is connected to the disclosed apparatus. When connected, the processor of the disclosed apparatus may instantiate a monitoring application, which may request a communication port number for communicating telemetry information received from the equipment to be monitored. The application mappings may store an association of the instantiated application and its corresponding communication port number. The apparatus may also establish a common communication interface for communicating with the various monitoring applications based on the stored application mappings. Thus, a client device need only communicate with the common communication interface instead of each of the monitoring applications separately.

26 Claims, 6 Drawing Sheets

PROXY REPORTING FOR CENTRAL MANAGEMENT SYSTEMS

CROSS-REFERENCE TO RELATED APPLICATIONS

The present application claims the benefit of the filing date of U.S. Provisional Patent Application No. 61/714,341 filed Oct. 16, 2012, the disclosure of which is hereby incorporated herein by reference.

BACKGROUND

A datacenter may have many different types of equipment being used. For example, the datacenter may have redundant or backup power supplies, redundant data communications connections, environmental controls (e.g., air conditioning, fire suppression) and security devices. In addition, a datacenter may have equipment for operating and managing a telecommunication network, providing applications to one or more customers, providing hosted applications for a third-party to provide to its customers, and other such equipment.

As the equipment in the datacenter may be costly or important to an operation (e.g., webpage hosting, Internet search and indexing, telecommunication networking, etc.), the equipment may provide telemetry information to inform the datacenter operator of the equipment's condition.

However, to access the telemetry information being provided by a given piece of equipment, the datacenter operator may be required to establish a communication link between the given piece of equipment and a monitoring server. This arrangement can be problematic when there are numerous pieces of equipment being monitored at any given time since it requires the datacenter operator to expend resources in establishing communication links with each piece of monitored equipment.

Moreover, obtaining the telemetry information from the equipment being monitored is laborious when there are numerous pieces of equipment involved. Depending on the arrangement, a datacenter operator may have to query each equipment individually. Furthermore, in the event of equipment failure, the datacenter operator may have to investigate where the failed equipment is located. Locating failed equipment in a datacenter can also be problematic since the location of a piece of equipment may be subject to change. This dynamic arrangement requires time and effort on behalf of the datacenter operator to find the failed equipment.

SUMMARY

To address these and other problems, this disclosure provides for an apparatus for providing telemetry information received from one or more telemetry sensor controllers. In one embodiment, the apparatus includes a memory configured to store a first application mapping that includes a mapping between a first telemetry monitoring application and a first communication identifier, and a second application mapping that includes a mapping between a second telemetry monitoring application and a second communication identifier.

The apparatus may also include a processor in communication with the memory. The processor may be configured to detect a connection with a first device, instantiate the first telemetry monitoring application for the first device and determine the first communication identifier associated with the first telemetry monitoring application, and update the first application mapping with the association of the instantiated first telemetry monitoring application and the determined first communication identifier. The processor may also be configured to update the second application mapping based on the first application mapping, receive a first telemetry value from the first device identified by the first communication identifier, and store the first telemetry value with an association of the first communication identifier. Furthermore, the processor may be configured to provide the first telemetry value to a client device.

In another embodiment of the apparatus, the processor may be further configured to update the second application mapping based on the first application mapping at a predetermined time interval.

In a further embodiment of the apparatus, the processor may be further configured to receive the first telemetry value from the first device at predetermined time intervals.

In yet another embodiment of the apparatus, the processor may be further configured to compare the second communication identifier of the second application mapping with the first communication identifier of the first application mapping, and remove the second application mapping when the second communication identifier is present in the second application mapping and not present in the first application mapping.

In yet a further embodiment of the apparatus, the processor may be further configured to compare the second communication identifier in the second application mapping with the first communication identifier in the first application mapping, and remove the second application mapping when the second communication identifier is different from the first communication identifier.

In another embodiment of the apparatus, the first communication identifier may identify a physical location of the first device.

In a further embodiment of the apparatus, the first communication identifier may be selected from a predetermined numerical range of values.

In yet another embodiment of the apparatus, the first telemetry value may be representative of one of a battery discharging status, a firmware revision number, or a battery temperature.

In yet a further embodiment of the apparatus, the processor may be further configured to remove the first telemetry value when a comparison of the first application mapping with the second application mapping indicates that the first device associated is no longer connected.

In another embodiment of the apparatus, the processor may be further configured to detect a connection with a second device, instantiate a third telemetry monitoring application, and determine a third communication identifier associated with the third telemetry monitoring application, wherein the third communication identifier is different than the first communication identifier and establish a third application mapping that includes a mapping between the third telemetry monitoring application and the third communication identifier. The processor may also be configured to establish a fourth application mapping based on the third application mapping and receive a second telemetry value from the second device, the second device being identified by the third communication identifier. The processor may be further configured to store the second telemetry value with an association of the third communication identifier, and provide the first telemetry value and the second telemetry value to the client device.

In a further embodiment of the apparatus, the processor may be further configured to establish a common communication interface configured to provide the first telemetry value or the second telemetry value, and communicate the first telemetry value or the second telemetry value through the common communication interface to the client device.

In yet another embodiment of the apparatus, the first communication identifier may identify a physical port to which the first device is connected.

In yet a further embodiment of the apparatus, the first communication identifier may be constructed from a sequence of alphanumeric characters such that the sequence of alphanumeric characters represents a network hierarchy that includes the first device.

This disclosure also provides a method for providing telemetry information received from one or more telemetry sensor controllers. In one embodiment, the method may include detecting, with a processor in communication with a computer-readable memory, a connection with a first device, and instantiating, with the processor, a first telemetry monitoring application for the first device. The method may also include determining, with the processor, a first communication identifier associated with the first telemetry monitoring application, and updating, with the processor, a first application mapping stored in the computer-readable memory with the association of the instantiated first telemetry monitoring application and the determined first communication identifier. The method may further include updating, with the processor, a second application mapping stored in the computer-readable based on the first application mapping, wherein the second application mapping includes a mapping between a second telemetry monitoring application and a second communication identifier. Furthermore, the method may include receiving, with the processor, a first telemetry value from the first device identified by the first communication identifier, storing, in the computer-readable memory, the first telemetry value with an association of the first communication identifier, and providing the first telemetry value to a client device.

In another embodiment of the method, the method may include updating the second application mapping based on the first application mapping at a predetermined time interval.

In a further embodiment of the method, the method may include receiving the first telemetry value from the first device at predetermined time intervals.

In yet another embodiment of the method, the method may include comparing, with the processor, the second communication identifier of the second application mapping with the first communication identifier of the first application mapping, and removing, with the processor, the second application mapping when the second communication identifier is present in the second application mapping and not present in the first application mapping.

In yet a further embodiment of the method, the method may include comparing, with the processor, the second communication identifier in the second application mapping with the first communication identifier in the first application mapping, and removing, with the processor, the second application mapping when the second communication identifier is different from the first communication identifier.

In another embodiment of the method, the first communication identifier may identify a physical location of the first device.

In a further embodiment of the method, the first communication identifier may be selected from a predetermined numerical range of values.

In yet another embodiment of the method, the first telemetry value may be representative of one of a battery discharging status, a firmware revision number, or a battery temperature.

In yet a further embodiment of the method, the method may include removing, with the processor, the first telemetry value when a comparison of the first application mapping with the second application mapping indicates that the first device associated is no longer connected.

In another embodiment of the method, the method may include detecting a connection with a second device, instantiating a third telemetry monitoring application, and determining a third communication identifier associated with the third telemetry monitoring application, wherein the third communication identifier is different than the first communication identifier. The method may also include establishing a third application mapping that includes a mapping between the third telemetry monitoring application and the third communication identifier, establishing a fourth application mapping based on the third application mapping, and receiving a second telemetry value from the second device, the second device being identified by the third communication identifier. The method may further include providing the first telemetry value and the second telemetry value to the client device.

In a further embodiment of the method, the method may include communicating the first telemetry value or the second telemetry value through a common communication interface to the client device.

In yet another embodiment of the method, the first communication identifier may identify a physical port to which the first device is connected.

In yet a further embodiment of the method, the first communication identifier may be constructed from a sequence of alphanumeric characters such that the sequence of alphanumeric characters represents a network hierarchy that includes the first device.

DETAILED DESCRIPTION

The present disclosure relates to a central management reporting system configured to centrally report telemetry information received from one or more telemetry sensor controllers. In one example, the central management reporting system establishes a proxy reporting application that monitors equipment connections with telemetry sensor controllers, and instantiates a telemetry monitoring application for each connected telemetry sensor controller. A telemetry sensor controller may include one or more telemetry sensors for collecting telemetry information about a piece of equipment being monitored by the telemetry sensor controller. The central management reporting system may also instantiate a telemetry information gathering application that collects telemetry information from the one or more telemetry sensor controllers, where the telemetry information gathering application provides the collected telemetry information to the proxy reporting application when requested by a client device. The proxy reporting application provides a central communication interface for a client device to receive telemetry information from multiple telemetry sensor controllers without having to query each telemetry sensor controller individually.

Figure 1:
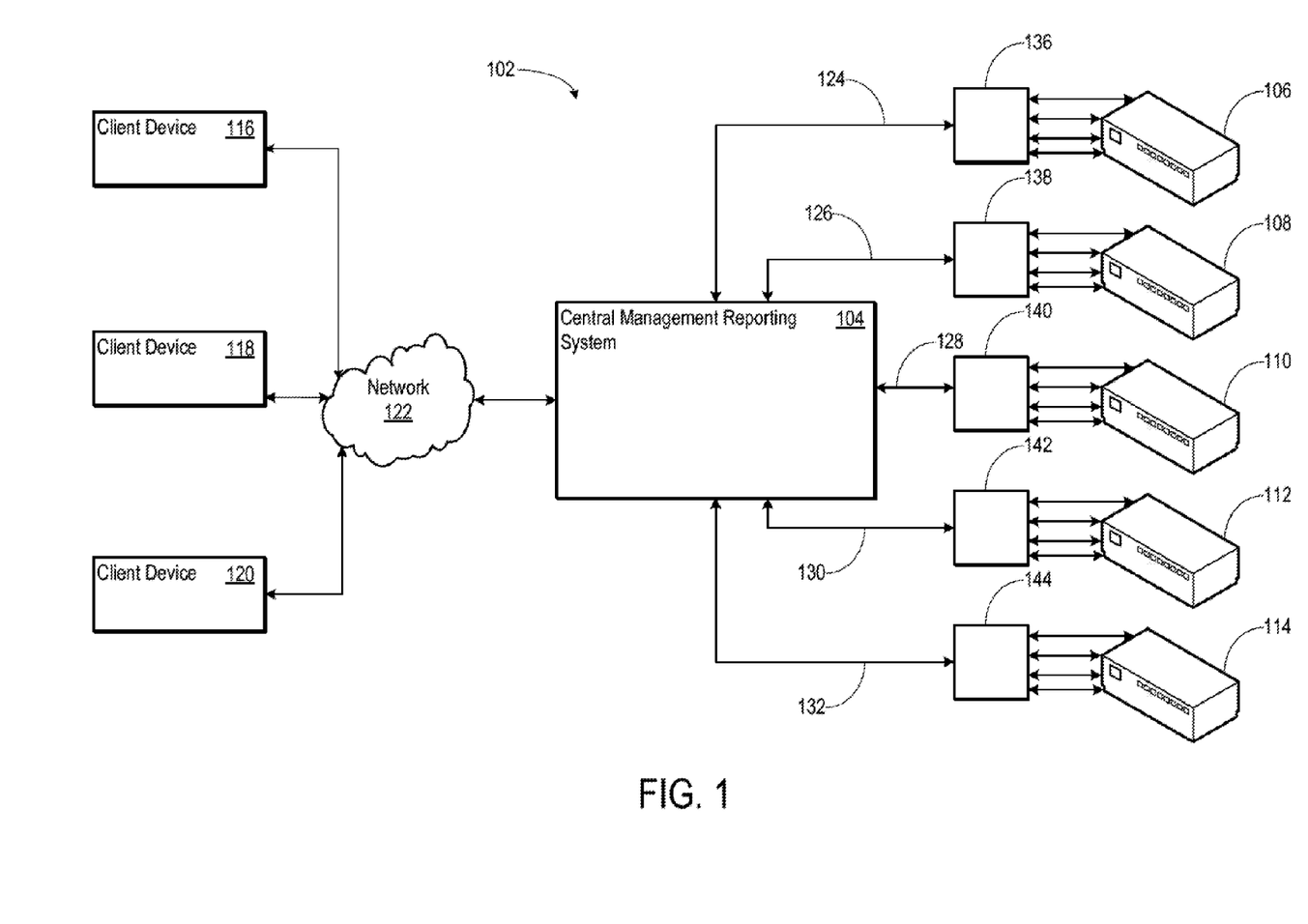
FIG. 1 illustrates an example of a central management reporting system in communication with client devices and monitored equipment according to aspects of the disclosure.

FIG. 1 illustrates an example of a datacenter environment 102 where a central management system 104 is in communication with one or more client devices 116-120 and one or more telemetry sensor controllers 136-144. The telemetry sensor controllers 136-144 with one or more telemetry sensors connected to one or more pieces of monitored equipment 106-114.

The monitored equipment 106-114 may be the types of equipment found in a datacenter, such as a rack appliance, a power supply, a security device, a desktop computer, a computing cluster, a networking device, or any other such equipment found in a datacenter. The monitored equipment 106-114 may also be any type of computing equipment, such as a desktop computer, a laptop computer, a tablet computer, a mobile device, or any other such type of computing equipment. Moreover, the monitored equipment 106-114 may be combinations of datacenter equipment (e.g., computing clusters, rack appliance, a battery backup, a cooling device, etc.), consumer equipment (e.g., desktop computers, mobile devices, etc.), and any other type of equipment configured to provide telemetry information.

The telemetry sensor controllers 136-144 may communicate with one or more telemetry sensors connected to the monitored equipment 106-114. The telemetry sensors may gather telemetry information regarding an associated monitored equipment, and the telemetry sensor controllers 136-144 may then provide this telemetry information to the central management reporting system 104.

The telemetry information provided by the telemetry sensor controllers 136-144 may include many different types of telemetry information. Examples of the types of telemetry information that may be collected include operational telemetry information, system-related telemetry information, environment telemetry information, or any other type of telemetry information. Operational telemetry information may include whether a piece of monitored equipment is operating and the status of said operation. System-related telemetry information may include firmware or software versions installed on a monitored equipment, the amount of free memory available to the monitored equipment, and other such system-related telemetry information. Environment telemetry information may include the operational temperature of the monitored equipment, the humidity in or near the monitored equipment, the noise level in or near the monitored equipment, and other such environment telemetry information.

The central management reporting system 104 may be configured to collect telemetry information from the telemetry sensor controllers 136-144. In this regard, the gathering of the telemetry information may be active, passive, or a combination thereof. The telemetry information provided by a telemetry sensor controller may be provided by the equipment itself (e.g., the equipment may be configured to provide the telemetry information), by a sensor or other module connected to the monitored equipment (e.g., a temperature sensor, a barometer, etc.), or by a combination of the two.

In actively collecting the telemetry information, the central management reporting system 104 may be configured to query one or more of the telemetry sensor controllers 136-144 for telemetry information. Actively collecting telemetry information from one or more telemetry sensor controllers may include query the one or more telemetry sensor controllers (or one or more sensors connected to a telemetry sensor controller) at predetermined time intervals. Furthermore, the predetermined time intervals may vary from telemetry sensor controller to telemetry sensor controller. Thus, the central management reporting system 104 may be configured to query a telemetry sensor controller monitoring a rack appliance every five minutes for telemetry information and configured to query a telemetry sensor controller monitoring a network router every thirty minutes for telemetry information. However, it is also contemplated that the central management reporting system 104 may query one or more telemetry sensor controllers at substantially identical time intervals. The central management reporting system 104 may or may not be configured to wait for a response from a first telemetry sensor controller before querying a second telemetry sensor controller for telemetry information.

In addition, the central management reporting system 104 may be selective in the type of telemetry information gathered from a telemetry sensor controller. In this regard, the central management reporting system 104 may request the type of telemetry information based on the type of telemetry sensor controller. In other words, the type of telemetry information requested from one telemetry sensor controller may be different than the type of telemetry information requested from another type of telemetry sensor controller. For example, the telemetry information requested from a telemetry sensor controller monitoring a power supply may be different than the telemetry information requested from a telemetry sensor controller monitoring a rack appliance being monitored. In this example, the telemetry information requested from the telemetry sensor controller monitoring the power supply may include the discharge state of the power supply and the telemetry information requested from the telemetry sensor controller monitoring the rack appliance may include the amount of data processed (e.g., search data, index data, e-mail data, etc.) by the rack appliance.

Furthermore, the central management reporting system 104 may be configured to query a telemetry sensor controller for any and/or all of the telemetry information that the telemetry sensor controller may provide. For example, the central management reporting system 104 may request that the telemetry sensor controller transmit its telemetry information and, in response, the telemetry sensor controller may simply report all of the telemetry information being monitored (e.g., all of the operational telemetry information, environment telemetry information, etc.). In this regard, generically requesting telemetry information from a telemetry sensor controller may or may not account for the different types of telemetry information that the telemetry sensor controller may provide.

Yet another approach to collecting telemetry information from a telemetry sensor controller may include an on-demand or real-time approach. In this regard, the central management reporting system 104 may query a given telemetry sensor controller for telemetry information when requested by a client device (e.g., any one of client devices 116-120) or based on the occurrence of an event (e.g., end of the business day, the detection of a failure in one or more of the monitored equipment, etc.).

The central management reporting system 104 may also leverage a passive approach to collecting telemetry information. With a passive approach, one or more of the telemetry sensor controllers 136-144 may be configured to report the telemetry information to the central management reporting system 104. Thus, the central management reporting system 104 may "listen" for incoming packets of data/information representing the telemetry information reported by a select telemetry sensor controller. In this passive approach, the telemetry sensor controllers 136-144 may take the "active" lead in reporting telemetry information to the central management reporting system 104. Thus, the telemetry sensor controllers 136-144 may report telemetry information to the central management reporting system 104 regardless whether the central management reporting system 104 queried the telemetry sensor controllers 136-144 for the telemetry information.

The central management reporting system 104 may communicate with the telemetry sensor controllers 136-144 via one or more communication channels 124-132. The communication channels 124-132 between the central management reporting system 104 and one or more telemetry sensor controllers 136-144 may be wired and/or wireless communication channels. Examples of wired communication channels are Ethernet, Universal Serial Bus ("USB"), external Serial Advanced Technology Attachment (e-SATA), Inter-Integrated Circuit ("I²C"), Small Computer System Interface ("SCSI"), and other such wired communication channels. Examples of wireless communication channels include Bluetooth (e.g., wireless communication channels operating in the 2400-2480 MHz band), the variations of IEEE 802.11 (e.g., IEEE 802.11a, IEEE 802.11b, etc.), Worldwide Interoperability for Microwave Access ("WiMAX"), and other such wireless technologies (e.g., any wireless technology operating in the industrial, scientific, and medical ("ISM") radio bands).

Figure 2:
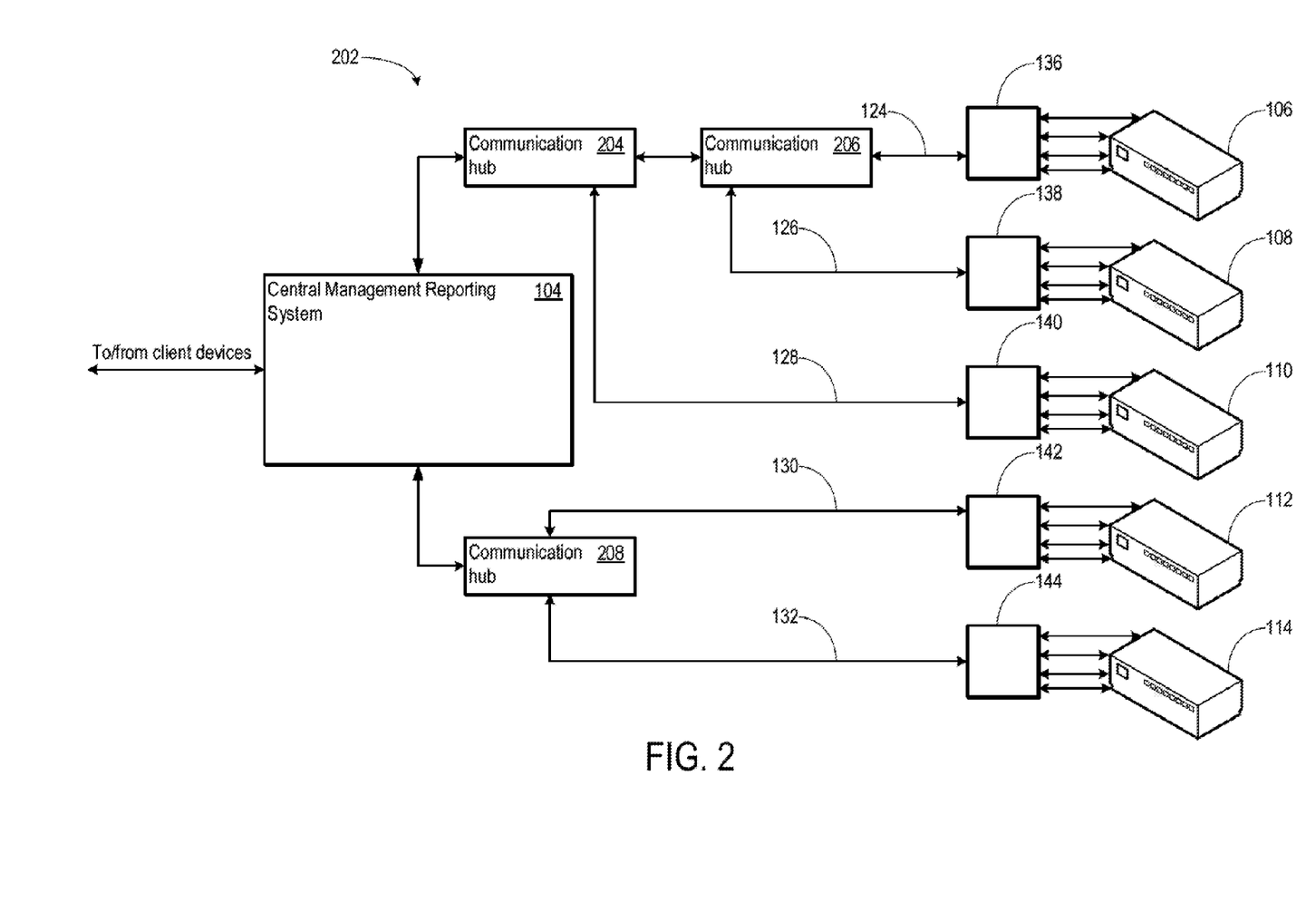
FIG. 2 illustrates an example of possible networking equipment that may be interposed between the central management reporting system and monitored equipment according to aspects of the disclosure.

In addition, there may be one or more intervening devices between the central management reporting system 104 and one or more of the telemetry sensor controllers 136-144. For instance, one or more of the telemetry sensor controllers 136-144 may be connected to a network switch or a USB hub (not shown in FIG. 1), and the network switch or USB hub may communicate with the central management reporting system 104. Moreover, it is contemplated that there may be several layers of intervening devices connecting the central management reporting system 104 and one or more of the telemetry sensor controllers 136-144. FIG. 2 illustrates one possible arrangement 202 of the central management reporting system 104 and the telemetry sensor controllers 136-144.

As shown in FIG. 2, an arrangement 202 of the central management reporting system 104 may place one or more of the telemetry sensor controllers 136-144 and monitored equipment 106-114 behind one or more communication hubs 204-208 (e.g., Ethernet switches, Ethernet hubs, USB hubs, etc). Moreover, there may be possible layers of the communication hubs 204-208 such that communication hubs 204/208 are in a first layer and communication hub 206 is in a second layer. In this manner, there may be any number of intervening devices (e.g., network switches, network routers, network hubs, USB hubs, etc.) interposed between the central management reporting system 104 and the telemetry sensor controllers 136-144.

As discussed in more detail below, the central management reporting system 104 and the telemetry sensor controllers 136-144 may leverage a communication port identifier that identifies which communication port of a communication hub (e.g., communication hubs 204-208) a particular telemetry sensor controller 136-144 is connected to. As the network topology of the arrangement 202 may be static (e.g., each of the telemetry sensor controllers is known to be in a specific location and connected to a specific port of a network equipment), the communication port identifier may be further correlated to the physical location of a given telemetry sensor controller. Thus, when the reported telemetry information indicates that there is a potential problem with a given telemetry sensor controller, the central management reporting system 104 may quickly identify the physical location of the troubled telemetry sensor controller and/or troubled monitored equipment based on the communication port identifier assigned to the telemetry sensor controller.

In an alternative arrangement, one or more of the telemetry sensor controllers 136-144 may store information about their physical location (e.g., where in the datacenter the telemetry sensor controller is located, the appliance rack where the telemetry sensor controller is located, etc.). In this alternative arrangement, the physical location of a telemetry sensor controller may be determined through communications with the telemetry sensor controller itself.

Referring back to FIG. 1, one or more client devices 116-120 may also be in communication with the central management reporting system 104. The client devices 116-120 may communicate with the central management reporting system 104 via a network 122. It is also contemplated that the client devices 116-120 may be directly connected to the central management reporting system 104 or that there be any number of intervening devices between the client devices 116-120 and the central management reporting system 104.

The network 122 may be any type of network, such as a wired network, a wireless network, or a combination thereof. Examples of wired networks include Ethernet networks, Local Area Networks, Wide Area Networks, and other such wired networks. The one or more wired networks of the network 122 may be established using any communication medium such as optical fiber, twisted pair cabling, twinaxial cabling, a backplane system, or any other such medium. Examples of wireless networks include networks established using any variant of IEEE 802.11, Bluetooth, WiMAX and other such wireless protocols. There may be any number of wired and/or wireless networks between a given client device and the central management reporting system 104.

The client devices 116-120 may be any type of client device, such as a desktop computer, a portable device, another system, or a combination thereof. Examples of portable devices include laptops, Personal Digital Assistants ("PDAs"), smartphones, tablet computers, and other such portable devices. Examples of systems include telecommunication systems, provisioning systems, web hosting systems, and other such systems. Thus, the present disclosure contemplates that the central management reporting system 104 may communicate with individual client devices (e.g., a desktop computer, a smartphone, etc.) and enterprise systems (e.g., a provisioning system, web hosting system, Internet search system, etc.)

Any one of the client devices 116-120 may request telemetry information from the central management reporting system 104. In one example, a client device may request telemetry information for a specific monitored equipment (e.g., monitored equipment 106) and/or from a specific telemetry sensor controller (e.g., telemetry sensor controller 136). In another example, a client device may request a specific type of telemetry information for a specific monitored equipment (e.g., operating telemetry information for the monitored equipment 106) and/or a specific telemetry sensor controller (e.g., operating telemetry information for the telemetry sensor controller 136). It is also contemplated that a client device may request all telemetry information for all of the monitored equipment 106-114 and/or from all of the telemetry sensor controllers 136-144. Thus regardless of the request, the central management reporting system 104 may be operative to provide any type of telemetry information from any one of the telemetry sensor controllers 136-144 to any one of the client devices 116-120.

Figure 3:
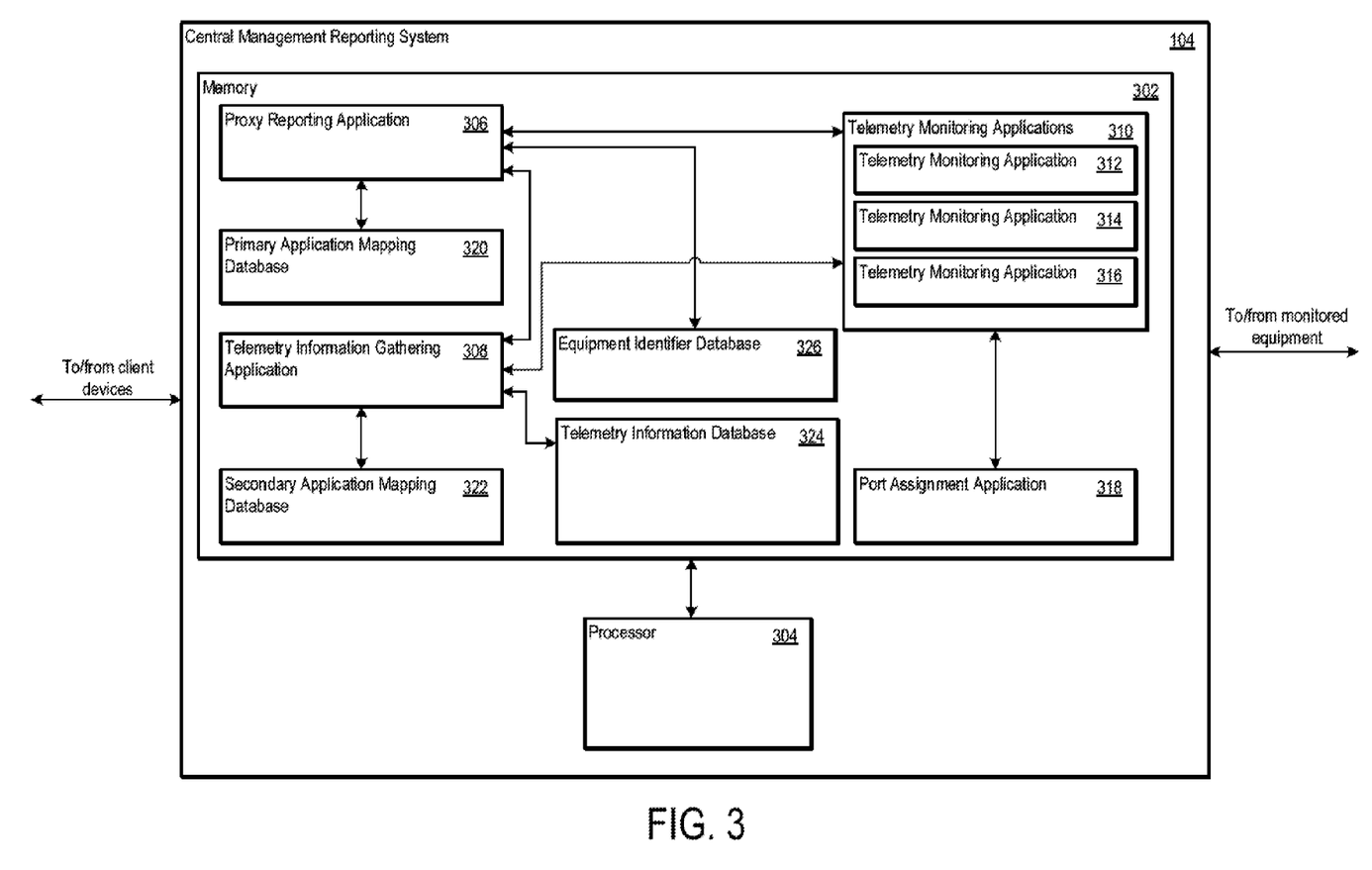
FIG. 3 illustrates an example of the central management reporting system according to aspects of the disclosure.

FIG. 3 illustrates an example of the central management reporting system 104. In this example, the central management reporting system 104 may include a memory 302 in communication with a processor 304. The central management reporting system 104 may instantiate and/or store any number of applications in the memory 302, such as a proxy reporting application 306, a telemetry information gathering application 308, a set of monitoring applications 310 (e.g., one or more monitoring applications 312-316), a communication port assignment application 318, and a device assignment application 328. The memory 302 may also store one or more databases, such as a primary application mapping database 320, a secondary application mapping database 322, a telemetry information database 324, and an equipment identifier database 326.

The processor 304 may be any conventional processor or microprocessor, such as commercially available CPUs. Alternatively, the processor 304 may be a dedicated device such as an application-specific integrated circuit ("ASIC").

Although FIG. 3 functionally illustrates the processor 304, the memory 302, and other elements of the central management reporting system 104 as being within the same block, the processor 304 and the memory 302 may actually comprise multiple processors and memories that may or may not be stored within the same physical housing. For example, the memory 302 may be a hard drive or other storage media located in a housing different from that of the central management reporting system 104. Accordingly, references to one or more processors, one or memories, the central management reporting system 104, or a computer will be understood to include references to a collection of processors or computers or memories that may or may not operate in parallel. Rather than using a single processor to perform the operations described herein, some of the components may each have their own processor that performs operations related to the component's specific function.

The memory 302 may be of any type of memory operative to store information accessible by the processor 304, including a computer-readable medium, or other medium that stores data that may be read with the aid of an electronic device, such as a hard-drive, memory card, read-only memory ("ROM"), random-access memory ("RAM"), an electrically erasable programmable read-only memory ("EEPROM"), one or more a digital video disc ("DVD") or other optical disks, as well as other write-capable and read-only memories. Systems and methods may include different combinations of the foregoing, whereby different portions of the software functionalities of the central management reporting system 104 are stored on different types of media.

The memory 302 may include any set of computer-executable instructions to be executed directly (such as machine code) or indirectly (such as scripts) by the processor 304. For example, the computer-executable instructions may be stored as computer code on a computer-readable medium. In that regard, the terms "instructions," "programs," and "applications" may be used interchangeably herein. The instructions may be stored in object code format for direct processing by the processor 304, or in any other computer language including scripts or collections of independent source code modules that are interpreted on demand or compiled in advance. Functions, methods and routines of these instructions are explained in more detail below.

The information stored within the databases 320-326 may be may be retrieved, stored or modified by the processor 304. For instance, although systems and methods disclosed herein are not limited by any particular data structure, the databases 320-326 may be stored in computer registers, as one or more relational databases defined by a table having a plurality of different fields and records, Extensible Markup Language ("XML") documents, flat files, a multi-dimensional array (e.g., a 1-dimensinal array, a 2-dimensional array, etc.) or combinations thereof. The databases 320-326 may also be formatted in any computer-readable format. In addition, the databases 320-326 may comprise any information sufficient to identify the relevant information, such as numbers, descriptive text, proprietary codes, references to data stored in other areas of the same memory or different memories (including other network locations) or information that is used by an application to calculate and/or store the relevant data.

In various examples described herein, the processor 304 may be located remote from the central management reporting system 104 and may communicate with one or more components and/or applications, such as the memory 302 and/or applications 306-318, wirelessly over a network (e.g., a local area network, a wide area network, etc.). In addition, one or more of the components may be housed within other servers or computers, and the central management reporting system 104 may receive information from those components. For example, one or more databases 320-326 may be stored in another server or computer and the processor 304 may receive information from each of these other servers and/or computers. In other aspects, some of the processes described herein are executed on a processor disposed within the central management reporting system 104 and others by a remote processor housed within a server being monitored, including performing operations for gathering and/or reporting telemetry information of one or more monitored equipment.

The central management reporting system 104 may instantiate a proxy reporting application 306. Instantiating the proxy reporting application 306, and any other of the disclosed applications, may include executing one or more computer-readable instructions stored in the memory 302.

The proxy reporting application 306 may provide a central communication interface by which a client device may request telemetry information from one or more of the telemetry sensor controllers. As the operation of one or more telemetry sensor controllers connected with the central management reporting system 104 may vary at any given time (e.g., a rack appliance may be operational at one time, but not operational at another time), the proxy reporting application 306 provides a convenient central destination for requesting telemetry information from a telemetry sensor controller so that a client device does not have to keep track of whether a given telemetry sensor controller is connected to the central management reporting system 104.

In instantiating the proxy reporting application 306, the proxy reporting application 306 may request a communication identifier, such as a communication port number, from the port assignment application 318. As is understood in computing, a communication port may be an application-specific or process-specific software construct serving as a communications endpoint in a computer's host operating system. The communication port may be identified by a 16-bit number, commonly known as the port number. Although a 16-bit number is typical, other bit sizes of port numbers is also contemplated, such as 32-bit numbers, 64-bit numbers, 128-bit numbers, and so forth.

Examples of typical communication ports include communication port 80 for Hypertext Transfer Protocol ("HTTP") communications, communication port 21 for File Transfer Protocol ("FTP") communications, and communication port 110 for Post Office Protocol (POPS) communications. The port assignment application 318 may be a module or system-related process running on the central management reporting system 104, and may be responsible for assigning communication port numbers to applications that request them. Accordingly, the proxy reporting application 306 may request a port number from the port assignment application 318.

While, in one example, the communication port number assigned to the proxy reporting application 306 is dynamic (e.g., the proxy reporting application 306 is assigned a communication port number based on whichever communication port number is available), the communication port number assigned to the proxy reporting application 306 may instead be a static communication port number. In this regard, the central management reporting system 104 may be configured to assign the same communication port number to the proxy reporting application 306 each time the proxy reporting application 306 is instantiated. Accordingly, the communication port number assigned to the proxy reporting application 306 may be similar to "well-known" communication port numbers, e.g., communication port 80 for HTTP communications and communication port 21 for FTP communications.

With a statically assigned communication port number, a client device (or user thereof) may be informed beforehand of the communication port number for the proxy reporting application 306. Thus, a given client device may start communicating immediately with the proxy reporting application 306. With a dynamically assigned communication port number, the given client device may first communicate with the central management reporting system 104 to obtain the communication port number assigned to the proxy reporting application 306, and then the given client device may start communicating with the proxy reporting application 306.

Although the communication port number assigned to the proxy reporting application 306 may be "static" (e.g., the same communication port number is assigned each time the proxy reporting application 306 is instantiated), the communication port number may be configurable. Thus, the communication port number assigned to the proxy reporting application 306 may be subject to change, but may not necessarily change each time the proxy reporting application 306 is instantiated.

After instantiating the proxy reporting application 306, the proxy reporting application 306 may then "listen" for connections between the central management reporting system 104 and one or more of the telemetry sensor controllers. For example, when a USB connection is established with a telemetry sensor controller, the operating system executing on the central management reporting system 104 may notify the proxy reporting application 306 of the USB connection. The proxy reporting application 306 may also be informed of disconnections with one or more telemetry sensor controllers. In this manner, the proxy reporting application 306 is made aware of connections and disconnections between the central management reporting system 104 and connected or disconnected telemetry sensor controllers.

A telemetry sensor controller may then be connected to the central management reporting system 104. In one example, the telemetry sensor controller may be directly connected to the central management reporting system 104 (e.g., without intervening devices between the telemetry sensor controller and the central management reporting system 104). A device assignment application 328 may handle the instantiation of software interfaces to one or more of the connected telemetry sensor controllers. In this example, when the telemetry sensor controller is connected, the device assignment application 328 may learn of the physical communication port to which the telemetry sensor is connected. For example and with regard to the USB standard, the device assignment application 328 may receive an event notification that the telemetry sensor controller has been connected to the central management reporting system 104. Then, through the process of establishing a connection with the telemetry sensor controller as established by the USB standard, the device assignment application 328 may be informed of the physical communication port to which the telemetry sensor controller is connected.

In another example, a communication hub (e.g., a network switch, a USB hub, etc.) may be connected to the central management reporting system 104, in which one or more telemetry sensor controllers are connected (indirectly or directly) to the communication hub. When establishing the connection with the central management reporting system 104, the communication hub may report on the devices connected to the communication hub, including devices downstream (e.g., other network switches, network hubs, USB hubs, telemetry sensor controllers, and other devices). Moreover, in reporting the devices indirectly or directly connected to the communication hubs connected to the central management reporting system 104, the central management reporting system 104 (e.g., the device assignment application 328) may build a network topology of the connected devices. In this manner, the device assignment application 328 may be informed of the physical communication port to which a telemetry sensor is connected.

In enumerating the telemetry sensor controllers connected, directly or indirectly, the device assignment application 328 may receive an equipment identifier for the telemetry sensor controller. The equipment identifier may identify the type of telemetry sensor controller and may be stored in a memory of the telemetry sensor controller, such as an EEPROM or the like. More particularly, the equipment identifier may establish a product identifier and a vendor identifier for the telemetry sensor controller. The product identifier may identify a specific model of the telemetry sensor controller and the vendor identifier may identify the vendor that provided the telemetry sensor controller. In addition, the equipment identifier may be customized for a telemetry sensor controller so that the central management reporting system 104 may distinguish between the various types of telemetry sensor controllers connected to it.

After obtaining the communication port identifier and the equipment identifier for a select telemetry sensor controller, the device assignment application 328 may establish an association between the communication port identifier and the equipment identifier in a telemetry sensor controller mapping database (not shown). As telemetry sensor controllers are connected and disconnected from the central management reporting system 104, the device assignment application 328 may add (when a telemetry sensor controller is connected) and/or remove (when a telemetry sensor controller is disconnected or powered off) telemetry sensor controller mappings from the telemetry sensor controller mapping database.

The equipment identifier database 326 may include one or more mappings between a telemetry sensor controller equipment identifier and a telemetry monitoring application. The equipment identifier database 326 may be referenced by the proxy reporting application 306 in determining which telemetry monitoring application to instantiate for a select telemetry sensor controller. A telemetry sensor controller equipment identifier may also be associated with one or more telemetry monitoring applications. Similarly, a telemetry monitoring application may be associated with one or more telemetry sensor controller equipment identifiers. The central management reporting system 104 may include the equipment identifier database 314 because different telemetry monitoring applications may have different functionalities. For example, a telemetry monitoring application for a telemetry sensor controller that monitors a power supply may have different functionalities than a telemetry monitoring application for a telemetry sensor controller that monitors a hard drive or rack appliance. In this manner, the equipment identifier database 326 assists the proxy reporting application 306 in determining which telemetry monitoring application to instantiate.

When the proxy reporting application 306 instantiates a telemetry monitoring application (e.g., any one of the telemetry monitoring applications 312-316). The instantiated telemetry monitoring application may then request a communication port number from the port assignment application 318. The port assignment application 318 may then assign a communication port number to the requesting telemetry monitoring application. The communication port number assigned to the telemetry monitoring application may be a randomly assigned communication port number such that a given telemetry monitoring application may have a different communication port number each time the telemetry monitoring application is instantiated.

Moreover, when multiple telemetry monitoring applications (e.g., telemetry monitoring applications 312-316) are being executed by the central management reporting system 104104, each telemetry monitoring application may be assigned a different communication port number. Being assigned different communication port numbers may prevent messages intended for one telemetry monitoring application being sent to (or received by) another telemetry monitoring application.

The telemetry monitoring application may then transmit a message using a communications protocol (e.g., TCP/IP) to inform the telemetry sensor controller of the communications port number assigned to the telemetry monitoring application. When the telemetry sensor controller receives a request for telemetry information from the central management reporting system 104 or the telemetry sensor controller transmits a message containing telemetry information to the central management reporting system 104, the telemetry sensor controller may reference the communication port number assigned to the telemetry monitoring application.

In addition, the telemetry monitoring application may inform the proxy reporting application 306 of the communication port number it was assigned. To this end, the proxy reporting application 306 may maintain the primary application mapping database 320. The primary application mapping database 320 may include one or more mappings between a given telemetry monitoring application and a given communication port number. Furthermore, the proxy reporting application 306 may update the primary application mapping database 320 with associations between a telemetry monitoring application and the physical port to which a telemetry sensor controller is connected. As discussed previously with respect to FIG. 2, each of the telemetry sensor controllers 136-144 may be physically connected to a communication port (e.g., a USB port or Ethernet port) of a communication hub (e.g., communication hub 206). In one example, the proxy reporting application 306 may retrieve a communication port identifier from the telemetry sensor controller mapping database (not shown), and update the telemetry monitoring application database 320 with the retrieved communication port identifier.

As the disclosure contemplates that the telemetry sensor controllers 136-144 may not be physically removed from its location during operating, the telemetry monitoring application for the corresponding monitored equipment may also report to the proxy reporting application 306 how the monitored equipment is physically connected. In this regard, the central management reporting system 104 may establish a port assignment nomenclature that identifies the physical port and/or network topology for telemetry sensor controllers 136-144 in communication with the central management reporting system 104.

For example, and with reference to FIG. 2, suppose that network switch 204 has four ports (logically numbered "1," "2," "3," and "4") and that network switch 206 also has four ports (logically numbered "1," "2," "3," and "4"). Further suppose that the telemetry sensor controller 142 is connected to port 1 of communication hub 204, communication hub 206 is connected to port 2 of communication hub 204, the telemetry sensor controller 136 is connected to port 1 of the communication hub 206, and the telemetry sensor controller 138 is connected to port 2 of the communication hub 206. In this example, the device assignment application 328 may build a network topology that indicates a communication port identifier of "2s1p2p1" for the telemetry sensor controller 136, where "2s1" represents communication hub 204, "2s1p2" represents that communication hub 206 is connected to port 2 of communication hub 204, and "2s1p2p1" represents that telemetry sensor controller 136 is connected to port 1 of communication 206. Further still, the device assignment application 328, the proxy reporting application 306, or a telemetry monitoring application, may traverse the telemetry sensor controller mapping database (not shown) to construct the communication port identifier.

Based on the foregoing example, and with reference to the telemetry sensor controller 142, one would understand that, if the corresponding communication identifier of "2s3p1," that the telemetry sensor controller 142 was physically connected to port 1 of communication hub 208. Similarly, if the communication identifier of "2s3p2" was assigned and to the telemetry sensor controller 144, that the telemetry sensor controller 114 was physically connected to port 2 of the communication hub 208.

In this manner, the proxy reporting application 306 may also maintain an association of the telemetry sensor controllers and the physical port to which a telemetry sensor is connected. Thus, when received telemetry information indicates that a telemetry sensor controller is experiencing a malfunction (e.g., in a connected sensor, in the equipment being monitored, etc.) or operating deficiently, a technician may query the proxy reporting application 306 for the physical port to which the telemetry sensor controller is connected, and then readily identify the physical location of the malfunction.

Although the foregoing discussion contemplates that a telemetry sensor controller, a telemetry monitoring application, and/or the device assignment application 328 may provide a communication port identifier for the physical port to which the telemetry sensor controller is connected, this disclosure also contemplates that such information may be stored beforehand. For example, the central management reporting system 104 may maintain a network topology database (not shown) that contains a physical port mapping between a telemetry sensor controller and the physical port to which the telemetry sensor controller is connected. By traversing the entries in the network topology database and correlating the physical port numbers in the network topology database with the application mappings of the primary application mapping database 320 and/or the secondary application mapping database 322, the proxy reporting application 306 and/or the telemetry information gathering application 308 may identify the physical port to which a telemetry sensor controller is connected for a corresponding telemetry monitoring application.

Thus, the proxy reporting application 306 may maintain the primary application mapping database 320 to keep track of which communication identifiers (e.g., communication port numbers and/or physical port numbers) are assigned to which telemetry monitoring applications and telemetry sensor controllers. Moreover, an entry in the primary application mapping database 320 may be created each time a telemetry monitoring application is instantiated. Similarly, an entry in the primary application mapping database 320 may be removed when a telemetry sensor controller is disconnected from the central management reporting system 104 or powered off, and the corresponding telemetry monitoring application for the removed telemetry sensor controller is terminated. To this end, the primary application mapping database 320 may represent the current state of telemetry sensor controllers that are connected to the central management reporting system 104.

The proxy reporting application 306 may also instantiate a telemetry information gathering application 308. The telemetry information gathering application 308 may be operative to collect or receive telemetry information from one or more of the telemetry monitoring applications 312-316. The telemetry information gathering application 308 may maintain a telemetry information database 324 to store the information collected and/or received from the one or more telemetry monitoring applications 310. The telemetry information database 324 may be implemented as a multi-dimensional array, such as a 2-dimensional array or the like. Moreover, the telemetry information received from a given telemetry monitoring application may be received as a key/value pair (e.g., a telemetry parameter and a telemetry value), and the received key/value pair may be stored in the 2-dimensional array accordingly.

When telemetry information for a select telemetry sensor controller is requested from the central management reporting system 104, the proxy reporting application 306 may send a request to the telemetry information gathering application 308 to retrieve such information, which may then retrieve the requested information from the telemetry information database 324. The telemetry information gathering application 308 may then send the requested telemetry information to the proxy reporting application 306, which may then communicate the requested telemetry information to the requesting client device.

To keep track of which telemetry monitoring applications 312-316 are executing at any given time, the telemetry information gathering application 308 may maintain a secondary application mapping database 322. The secondary application mapping database 322 may be a copy of, or relatively identical to, the primary application mapping database 320. In one example, the telemetry information gathering application 308 may update the secondary application mapping database 322 at predetermined time intervals, such as every thirty seconds, every five minutes, or other time interval. The telemetry information gathering application 308 may also update the secondary application mapping database 322 based on an event, such as receiving an update from the proxy reporting application 306 that a change has occurred (e.g., a telemetry monitoring application has been instantiated or terminated, or has been re-assigned a communication port number). Updating the secondary application mapping database 322 may include adding entries, removing entries, modifying entries, or combinations thereof.

Updates or changes in the secondary application mapping database 322 may affect the telemetry information stored in the telemetry information database 324. More particularly, in order to manage the size of the telemetry information database 324, the telemetry information gathering application 308 may remove entries in the telemetry information database 324 (e.g., telemetry information for a telemetry monitoring application) based on differences between the secondary application mapping database 322 and the primary mapping application database 320.

The telemetry information gathering application 308 may update or modify the telemetry information database 324 under a variety of circumstances. In one example, the telemetry information gathering application 308 may remove telemetry information for a telemetry monitoring application when the mapping between the telemetry monitoring application and its corresponding communication identifier no longer exists in the primary application database 320. In this example, the removal of the telemetry monitoring application from the primary application mapping database 320 may indicate that the corresponding telemetry sensor controller is no longer connected to the central management reporting system 104 or that the telemetry sensor controller is powered off.

In another example, the telemetry information gathering application 308 may remove an entry for a telemetry monitoring application when the corresponding communication identifier in the primary application mapping database 320 is different from the corresponding communication identifier in the secondary application mapping database 322. A change in the communication identifier may signify that the telemetry sensor controller was disconnected at one point in time, or that the telemetry monitoring application was terminated. Since there may be operational differences in the telemetry sensor controller between the time the communication identifier was added to the secondary application mapping database 322 and the communication identifier changed in the primary application mapping database 320, the telemetry information gathering application 308 may remove the telemetry information from the telemetry information database 324 before adding newer telemetry information.

The telemetry information gathering application 308 may modify the telemetry information database 324 based on comparisons between the primary application mapping database 320 and the secondary application mapping database 322 at predetermined time intervals, based on a notification from the proxy reporting application 306, or a combination thereof. In one example, the telemetry information gathering application 308 may modify the telemetry information database 324 after updating the secondary application mapping database 322 or within substantially the same time frame.

When the secondary application mapping database 322 has been updated and/or populated with the mappings in the primary application mapping database 320, the telemetry information gathering application 308 may refer to the secondary application mapping database 322 to communicate with the various telemetry monitoring applications 310. The telemetry information gathering application 308 may request telemetry information from one or more telemetry monitoring applications 310 at predetermined time intervals (e.g., every thirty seconds, every five minutes, etc.), based on a request received by the telemetry information gathering application 308 for telemetry information, or a combination thereof.

In one example, the telemetry information gathering application 308 may request all of the telemetry information being monitored by a telemetry monitoring application. In this example, the telemetry information gathering application 308 may populate/update the telemetry information database 324 with all the types and values of telemetry information received from a telemetry monitoring application. Moreover, when the telemetry information gathering application 308 requests all of the telemetry types and corresponding values from a telemetry monitoring application, the telemetry information gathering application 308 may update or replace the previously stored telemetry information in the telemetry information database 324.

In another example, the telemetry information gathering application 308 may request an update for a specific type of telemetry information (e.g., operational telemetry information, environmental telemetry information, etc.) or for a specific telemetry parameter (e.g., the discharging status of a select monitored equipment or the firmware version number of firmware installed on a select monitored equipment). In this example, the telemetry information gathering application 308 may update the telemetry information database 324 with the telemetry values of the requested telemetry types or specific telemetry parameters, while leaving the remaining telemetry information intact.

While the proxy reporting application 306 and/or the telemetry information gathering application 308 are executing, the proxy reporting application 306 may receive a request from a client device for telemetry information. When the proxy reporting application 306 receives the request, the proxy reporting application 306 may communicate the request to the telemetry information gathering application 308.

In turn, the telemetry information gathering application 308 may query the telemetry information database 324 for the requested telemetry information. In addition, the telemetry information gathering application 308 may conduct an update of the telemetry information database 324 (e.g., removing telemetry information, updating telemetry information, etc.). The telemetry information gathering application 308 may then communicate the retrieved telemetry information to the proxy reporting application 306, which may then communicate the retrieved telemetry information to the requesting client device. In this manner, the requesting client device need not know of the communication port number of any of the telemetry monitoring applications nor does the requesting client device need to know how the telemetry information is reported by a telemetry monitoring application. Thus, the proxy reporting application 306 provides a central communication interface for client devices to request telemetry information from one or more equipment being monitored.

Figure 4A:
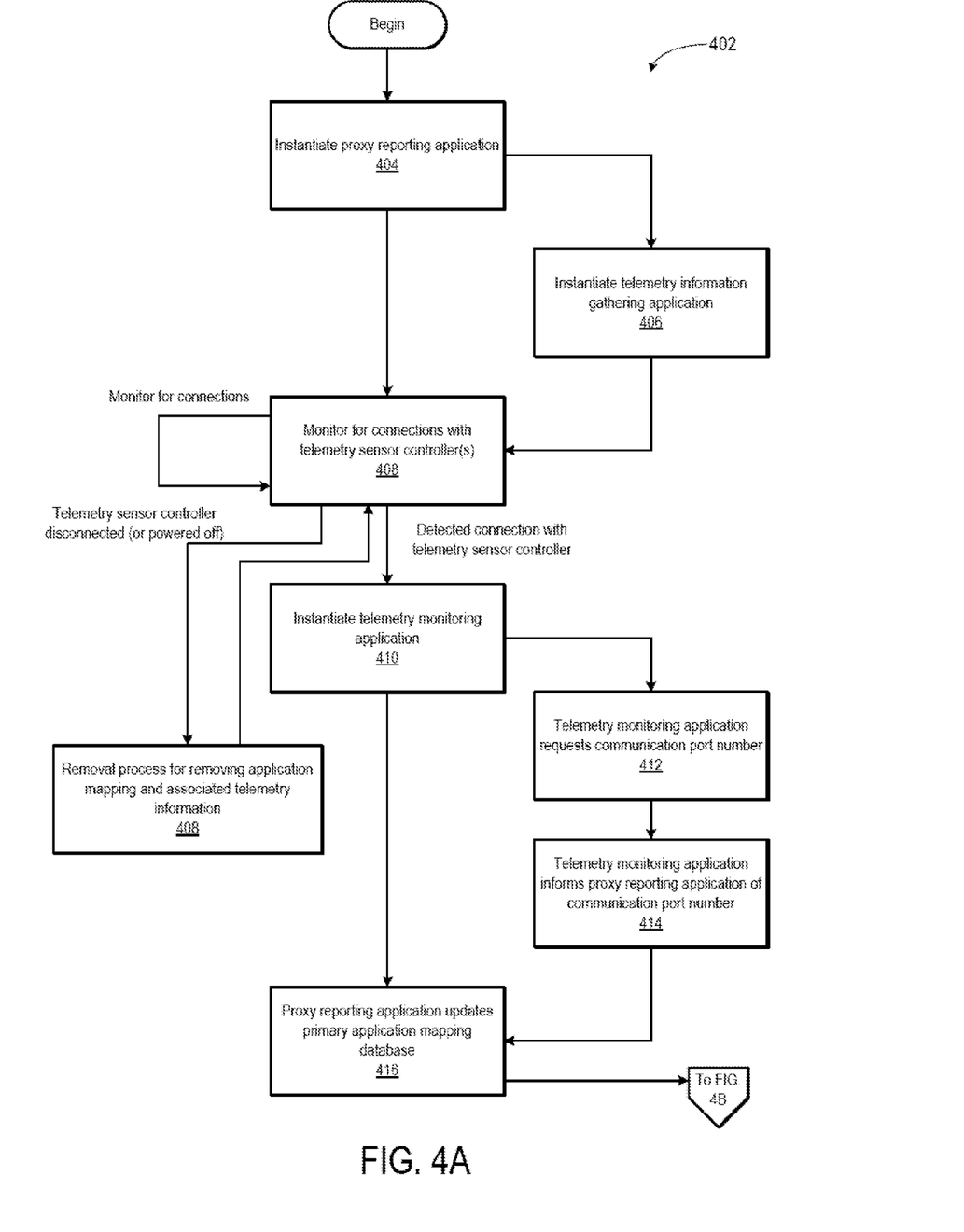
FIGS. 4A-4C illustrate an example of logic flow for receiving telemetry information from one or more telemetry sensor controllers according to aspects of the disclosure.
Figure 4B:
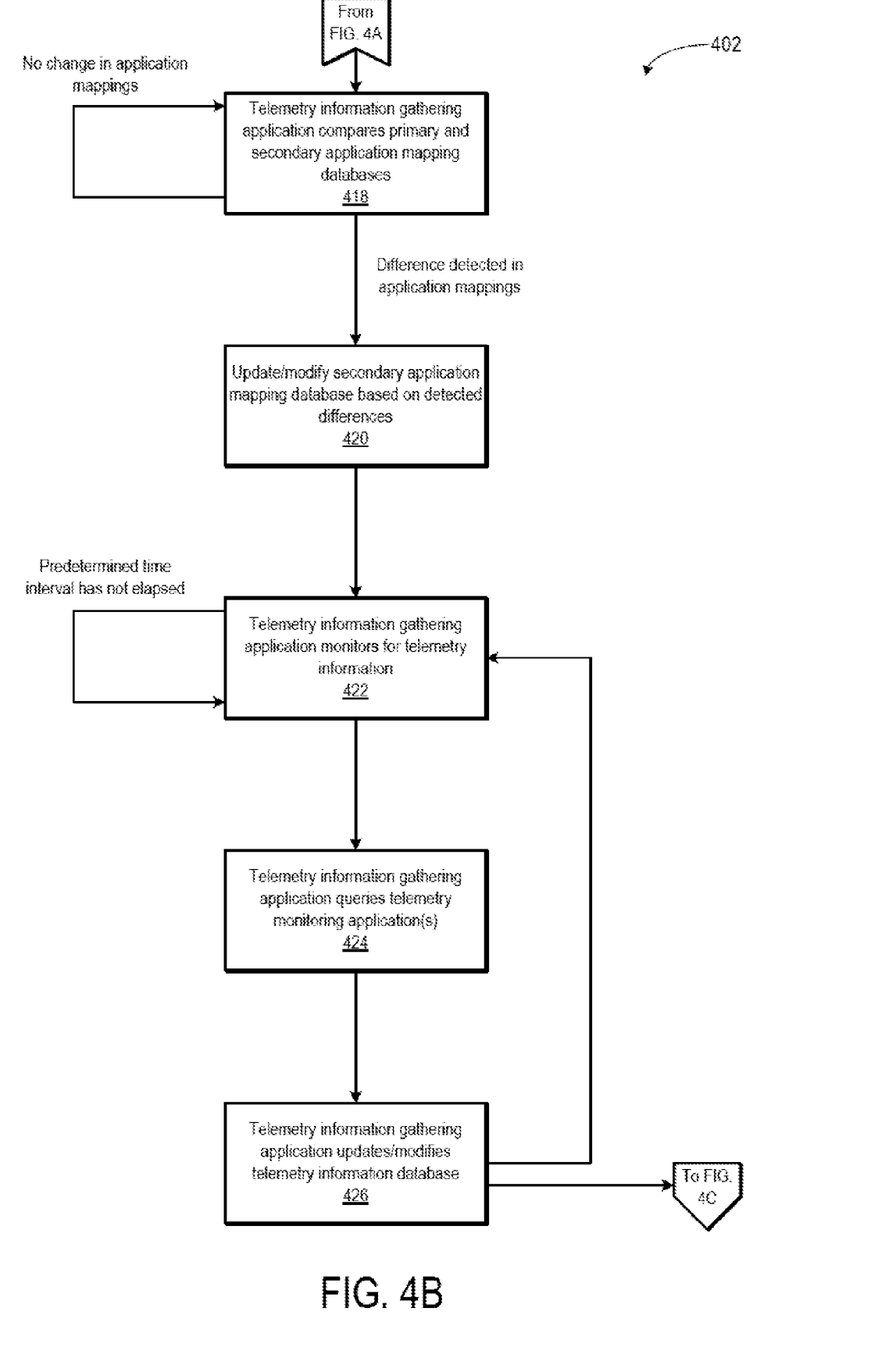
Figure 4C:
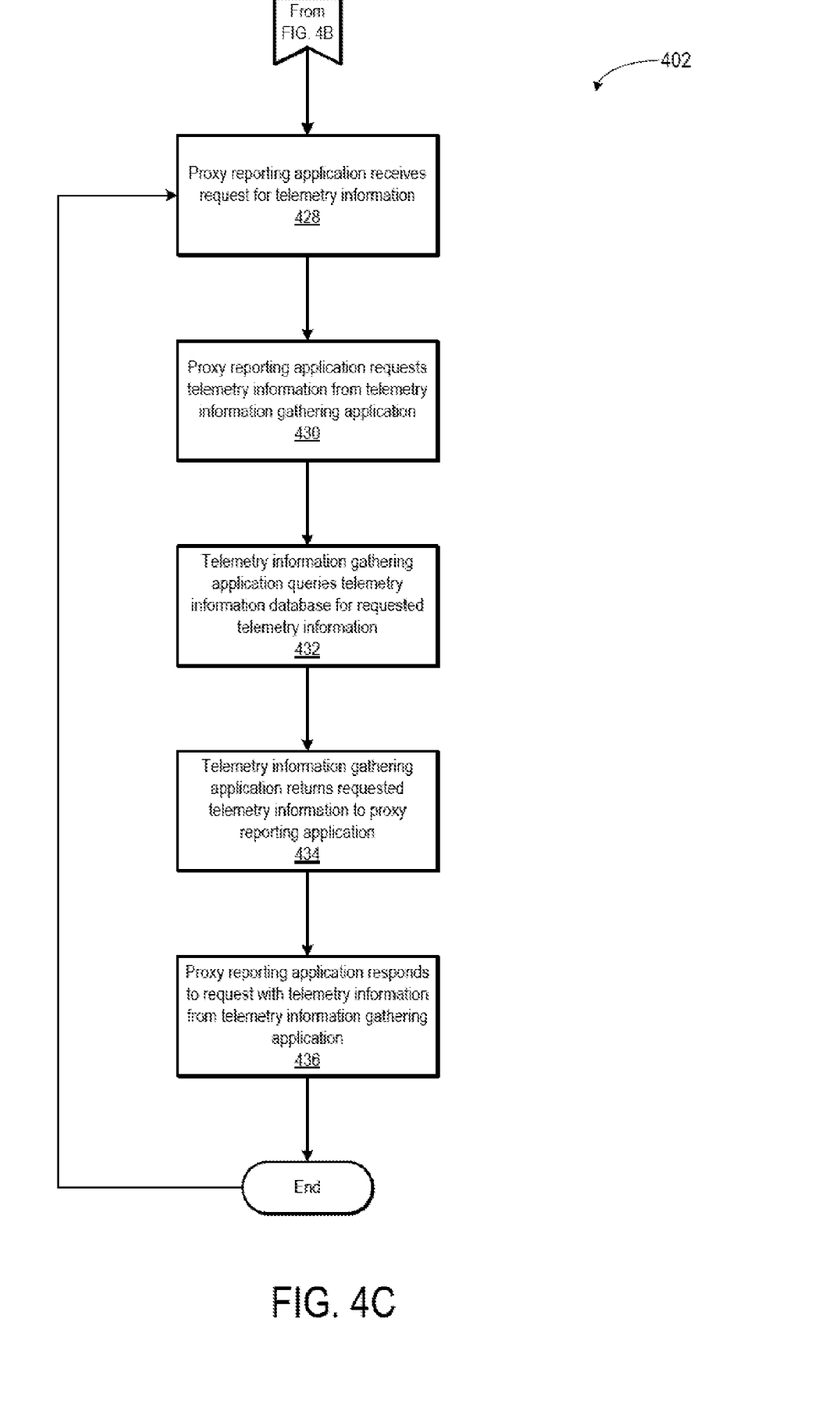

FIGS. 4A-4C illustrate an example of logic flow 402 for receiving telemetry information for telemetry sensor controllers according to aspects of the disclosure. Initially, the central management reporting system 104 may instantiate the proxy reporting application 306 (Block 404). Thereafter, the proxy reporting application 306 may instantiate the telemetry information gathering application 308 (Block 406).

The proxy reporting application 306 may then "listen," or monitor, for connections with one or more telemetry sensor controllers (Block 408). The proxy reporting application 306 may be notified of a connection one or more telemetry sensor controllers via a notification process of a computer operating system.

When a connection with one or more telemetry sensor controllers is established, the proxy reporting application 306 may then instantiate one or more telemetry monitoring applications (Block 410). The one or more telemetry monitoring applications may then request one or more communication port numbers, such as by requesting one or more communication port numbers from the port assignment application 318 (Block 412). The one or more telemetry monitoring applications may then inform the proxy reporting application 306 of the one or more communication port numbers assigned to the telemetry monitoring application (Block 414). The one or more telemetry monitoring applications may also inform the proxy reporting application 306 of other communication identifiers, such as the physical port number to which the monitored equipment is connected.

Based on the received communication identifiers, the proxy reporting application 306 may then update the primary application mapping database (Block 416). Although the logic flow 402 illustrates the logic flow to be continuous from various logic blocks (e.g., Block 408), it should be understood that the operations for these blocks may be performed continuously while other operations are being performed within other logic blocks (e.g., Blocks 412-416). Thus, the proxy reporting application 306 may continuously monitor for connections with other telemetry sensor controllers while associating communication port identifiers to telemetry monitoring applications that were previously instantiated.

Continuing to FIG. 4B, the telemetry information gathering application 408 may monitor for changes between the primary application mapping database 320 and the secondary application mapping database 322 (Block 418). When a change is detected, such as when a new application mapping is established in the primary application mapping database 320, the telemetry information gathering application 408 may update the secondary application mapping database 322 accordingly (Block 420).

As previously discussed, updating the secondary application mapping database 322 may include adding an application mapping, removing an application mapping, modifying an application, or a combination thereof for one or more application mappings. Moreover, changes to the secondary application mapping database 322 may cause changes in the telemetry information database 324, such as the removal of telemetry information from the telemetry information database 324 when an application mapping for a corresponding telemetry monitoring application is removed from, or modified in, the secondary application mapping database 322.

The telemetry information gathering application 308 may then gather and/or receive telemetry information from one or more of the telemetry monitoring applications (Block 422). In one example, the telemetry information gathering application 308 may wait until a predetermined time period has elapsed before querying one or more telemetry monitoring applications for updated and/or new telemetry information. In another example, the telemetry information gathering application 308 may receive a request, such as a request from the proxy reporting application 306, to retrieve updated telemetry information from one or more telemetry monitoring applications.

When the predetermined time period has elapsed (in one example) or a request is received (in another example), the telemetry information gathering application 308 may query one or more telemetry monitoring applications for telemetry information for a given monitored equipment (Block 424). Querying the telemetry monitoring application may include querying the communication port number assigned to the telemetry monitoring application. When the telemetry information is received from a select telemetry monitoring application (e.g., in the form of one or more key/value pairs), the telemetry information gathering application 308 may then update the telemetry information database 324 with the received telemetry information (Block 426). The process of receiving and/or gathering telemetry information (e.g., Blocks 422-426) for a given telemetry monitoring application may continue until a given event occurs, such as the telemetry monitoring application being terminated, the telemetry sensor controller is disconnected from the central management reporting system 104, or the like.

Referring to FIG. 4C, the proxy reporting application 306 may receive a request for telemetry information, such as by receiving a request from a client device (Block 428). As previously discussed, the request may be a request for any type or amount of telemetry information, such as a request to provide all the telemetry information that is being gathered/reported, specific types of telemetry information, specific telemetry parameter values, or combinations and/or variations thereof.

The proxy reporting application 306 may then request the telemetry information from the telemetry information gathering application 308 (Block 430). Based on the request, the telemetry information gathering application 308 may query the telemetry information database 324 for the requested telemetry information (Block 432). In addition, the telemetry information gathering application 308 may query one or more of the telemetry monitoring applications for updated telemetry information, such as where the predetermined time interval is about to expire when the request for telemetry information is received. The telemetry information gathering application 308 may then return the requested telemetry information to the proxy reporting application 306 (Block 434), which may then respond to the client device with the telemetry information that was request (Block 436).

Accordingly, this disclosure provides for a central management reporting system 104 operative to receive telemetry information for one or more telemetry sensor controllers. Furthermore, the central management reporting system 104 may provide a central communication interface (e.g., the proxy reporting application 306) through which one or more client devices may request telemetry information from the telemetry sensor controllers in communication with the central management reporting system 104. As the central management reporting system 104 may leverage a two-tier reporting architecture, where the telemetry information gathering application 308 receives and stores telemetry information for later communications with the proxy reporting application 306, client devices connected to the central management reporting system 104 need not know of the specific communication parameters and values needed to communicate with the telemetry sensor controllers in communication with the central management reporting system 104.

Moreover, since the telemetry sensor controllers in communication with the central management reporting system 104 may be associated with a communication identifier (e.g., a physical port number) or, alternatively, the central management reporting system 104 may maintain a network topology database of connected telemetry sensor controllers, the central management reporting system 104 facilitates the rapid identification of the physical location of a telemetry sensor controller and the equipment being monitored by the telemetry sensor controller when the telemetry information received for that telemetry sensor controller indicates a potential problem. Thus, the central management reporting system 104 represents a technological advancement in the deployment and monitoring of equipment when a rapid response is needed to the identification of a potential equipment failure.

As these and other variations and combinations of the features discussed above can be utilized without departing from the subject matter as defined by the claims, the foregoing description should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An apparatus for providing telemetry information received from one or more telemetry sensor controllers, the apparatus comprising:
   a memory configured to store:
      a first application mapping that includes a mapping between a first telemetry monitoring application and a first communication identifier,
      a second application mapping that includes a mapping between a second telemetry monitoring application and a second communication identifier, and
   a processor in communication with the memory and configured to:
      detect a connection with a first telemetry sensor controller,
      instantiate the first telemetry monitoring application for the first telemetry sensor controller and determine the first communication identifier associated with the first telemetry monitoring application,
      update the first application mapping with the association of the instantiated first telemetry monitoring application and the determined first communication identifier,
      update the second application mapping based on the first application mapping,
      receive, from the first telemetry sensor controller identified by the first communication identifier, a first telemetry value collected by one or more telemetry sensors connected to a first monitored equipment;
      store the first telemetry value with an association of the first communication identifier, and
      provide the first telemetry value to a client device.

2. The apparatus of claim 1, wherein the processor is further configured to update the second application mapping based on the first application mapping at a predetermined time interval.

3. The apparatus of claim 1, wherein the processor is further configured to receive the first telemetry value from the first telemetry sensor controller at predetermined time intervals.

4. The apparatus of claim 1, wherein the processor is further configured to:
   compare the second communication identifier of the second application mapping with the first communication identifier of the first application mapping; and
   remove the second application mapping when the second communication identifier is present in the second application mapping and not present in the first application mapping.

5. The apparatus of claim 1, wherein the processor is further configured to:
   compare the second communication identifier in the second application mapping with the first communication identifier in the first application mapping; and
   remove the second application mapping when the second communication identifier is different from the first communication identifier.

6. The apparatus of claim 1, wherein the first communication identifier identifies a physical location of the first telemetry sensor controller.

7. The apparatus of claim 1, wherein the first communication identifier is selected from a predetermined numerical range of values.

8. The apparatus of claim 1, wherein the first telemetry value is representative of one of a battery discharging status, a firmware revision number, or a battery temperature.

9. The apparatus of claim 1, wherein the processor is further configured to remove the first telemetry value when a comparison of the first application mapping with the second application mapping indicates that the first telemetry sensor controller associated is no longer connected.

10. The apparatus of claim 1, wherein the processor is further configured to:
 detect a connection with a second telemetry sensor controller, instantiate a third telemetry monitoring application, and determine a third communication identifier associated with the third telemetry monitoring application, wherein the third communication identifier is different than the first communication identifier;
 establish a third application mapping that includes a mapping between the third telemetry monitoring application and the third communication identifier;
 establish a fourth application mapping based on the third application mapping;
 receive a second telemetry value from the second telemetry sensor controller, the second telemetry sensor controller being identified by the third communication identifier;
 store the second telemetry value with an association of the third communication identifier; and
 provide the first telemetry value and the second telemetry value to the client device.

11. The apparatus of claim 9, wherein the processor is further configured to:
 establish a common communication interface configured to provide the first telemetry value or the second telemetry value; and
 communicate the first telemetry value or the second telemetry value through the common communication interface to the client device.

12. The apparatus of claim 1, wherein the first communication identifier identifies a physical port to which the first telemetry sensor controller is connected.

13. The apparatus of claim 1, wherein the first communication identifier is constructed from a sequence of alphanumeric characters such that the sequence of alphanumeric characters represents a network hierarchy that includes the first telemetry sensor controller.

14. A method for providing telemetry information received from one or more telemetry sensor controllers, the method comprising:
 detecting, with a processor in communication with a computer-readable memory, a connection with a first telemetry sensor controller;
 instantiating, with the processor, a first telemetry monitoring application for the first telemetry sensor controller;
 determining, with the processor, a first communication identifier associated with the first telemetry monitoring application;
 updating, with the processor, a first application mapping stored in the computer-readable memory with the association of the instantiated first telemetry monitoring application and the determined first communication identifier;
 updating, with the processor, a second application mapping stored in the computer-readable based on the first application mapping, wherein the second application mapping includes a mapping between a second telemetry monitoring application and a second communication identifier;
 receiving, with the processor, from the first telemetry sensor controller identified by the first communication identifier, a first telemetry value collected by one or more telemetry sensors connected to a first monitored equipment;
 storing, in the computer-readable memory, the first telemetry value with an association of the first communication identifier; and
 providing the first telemetry value to a client device.

15. The method of claim 14, further comprising:
 updating the second application mapping based on the first application mapping at a predetermined time interval.

16. The method of claim 14, further comprising:
 receiving the first telemetry value from the first telemetry sensor controller at predetermined time intervals.

17. The method of claim 14, further comprising:
 comparing, with the processor, the second communication identifier of the second application mapping with the first communication identifier of the first application mapping; and
 removing, with the processor, the second application mapping when the second communication identifier is present in the second application mapping and not present in the first application mapping.

18. The method of claim 14, further comprising:
 comparing, with the processor, the second communication identifier in the second application mapping with the first communication identifier in the first application mapping; and
 removing, with the processor, the second application mapping when the second communication identifier is different from the first communication identifier.

19. The method of claim 14, wherein the first communication identifier identifies a physical location of the first telemetry sensor controller.

20. The method of claim 14, wherein the first communication identifier is selected from a predetermined numerical range of values.

21. The method of claim 14, wherein the first telemetry value is representative of one of a battery discharging status, a firmware revision number, or a battery temperature.

22. The method of claim 14, further comprising:
 removing, with the processor, the first telemetry value when a comparison of the first application mapping with the second application mapping indicates that the first telemetry sensor controller associated is no longer connected.

23. The method of claim 14, further comprising:
 detecting a connection with a second telemetry sensor controller;
 instantiating a third telemetry monitoring application;
 determining a third communication identifier associated with the third telemetry monitoring application, wherein the third communication identifier is different than the first communication identifier;
 establishing a third application mapping that includes a mapping between the third telemetry monitoring application and the third communication identifier;
 establishing a fourth application mapping based on the third application mapping;
 receiving a second telemetry value from the second telemetry sensor controller, the second telemetry sensor controller being identified by the third communication identifier; and
 providing the first telemetry value and the second telemetry value to the client device.

24. The method of claim 23, further comprising:
communicating the first telemetry value or the second telemetry value through a common communication interface to the client device.

25. The method of claim 14, wherein the first communication identifier identifies a physical port to which the first telemetry sensor controller is connected.

26. The method of claim 14, wherein the first communication identifier is constructed from a sequence of alphanumeric characters such that the sequence of alphanumeric characters represents a network hierarchy that includes the first telemetry sensor controller.

\* \* \* \* \*